(12) United States Patent
Hill

(10) Patent No.: US 11,313,245 B2
(45) Date of Patent: Apr. 26, 2022

(54) SHAFT MONITORING SYSTEM

(71) Applicant: ROLLS-ROYCE plc, London (GB)

(72) Inventor: Ralph W Hill, Derby (GB)

(73) Assignee: ROLLS-ROYCE PLC, London (GB)

(*) Notice: Subject to any disclaimer, the term of this patent is extended or adjusted under 35 U.S.C. 154(b) by 250 days.

(21) Appl. No.: 16/747,745

(22) Filed: Jan. 21, 2020

(65) Prior Publication Data

US 2020/0240286 A1  Jul. 30, 2020

(30) Foreign Application Priority Data

Jan. 28, 2019 (GB) .................................. 1901113

(51) Int. Cl.
*F01D 21/00* (2006.01)
*F01D 21/06* (2006.01)
(Continued)

(52) U.S. Cl.
CPC ............ *F01D 21/003* (2013.01); *F01D 21/06* (2013.01); *G01H 1/006* (2013.01); *G01P 3/46* (2013.01); *F05D 2270/80* (2013.01)

(58) Field of Classification Search
CPC ....... F01D 21/003; F01D 21/06; G01H 1/006; G01P 3/46; G01P 3/488; G01P 3/489;
(Continued)

(56) References Cited

U.S. PATENT DOCUMENTS 4,408,290 A    10/1983   Kubo et al.
4,626,781 A *  12/1986   Forkel ..................... B60T 8/171
                                                      310/155
(Continued)

FOREIGN PATENT DOCUMENTS

DE    10 2009 002 374 A1   10/2010
EP         0287214 A2      10/1988
(Continued)

OTHER PUBLICATIONS

Jun. 19, 2020 extended Search Report issued in European Patent Application No. 20150206.9.
(Continued)

*Primary Examiner* — Suman K Nath
(74) *Attorney, Agent, or Firm* — Oliff PLC

(57) ABSTRACT

A monitoring system for monitoring one or more properties associated with a rotating shaft is provided. The system includes a first phonic wheel which is mounted coaxially to the shaft for rotation therewith, the first phonic wheel comprising a circumferential row of teeth. The system further includes a first sensor configured to detect the passage of the row of teeth of the first phonic wheel by generating a first alternating measurement signal. The system further includes a processor unit configured to determine the durations of successive first speed samples. Each first speed sample is a block of n successive cycles of the first alternating measurement signal, where n is an integer, and in which the beginning of each cycle is a zero-crossing point from the previous cycle and the end of each cycle is the corresponding zero-crossing point to the next cycle. At least one axial location of the first phonic wheel every $m^{th}$ tooth of the row of teeth of the first phonic wheel has a circumferential thickness which is different from that of the other teeth of the first phonic wheel, where m is an integer, $m \neq n$, and m is neither a factor nor a multiple of n. When the first sensor is positioned at said axial location of the first phonic wheel and at any given rotational speed of the first phonic wheel, the durations of the successive first speed samples display a characteristic repeating pattern of longer and shorter sample durations relative to the average duration of the successive first speed samples. The amount by which the longer and shorter sample durations differ from the average duration is in proportion to the amount by which the (Continued)

circumferential thickness of the $m^{th}$ teeth differs from that of the other teeth at said axial location of the first phonic wheel. The processor unit monitors the properties associated with the rotating shaft from the characteristic repeating pattern.

14 Claims, 12 Drawing Sheets

(51) Int. Cl.
*G01H 1/00* (2006.01)
*G01P 3/46* (2006.01)

(58) Field of Classification Search
CPC .... F05D 2270/80; G01B 7/003; G01D 5/246; G01L 3/109; B64F 5/60; G01M 13/00; G01M 13/025; B64C 2201/048
See application file for complete search history.

(56) References Cited

U.S. PATENT DOCUMENTS

| | | | |
|---|---|---|---|
| 4,833,405 A | 5/1989 | Richards et al. | |
| 4,893,075 A * | 1/1990 | Dierker, Jr. | G01P 3/488 324/174 |
| 6,313,625 B1 * | 11/2001 | Varady | G01D 5/2013 324/173 |
| 6,737,861 B2 | 5/2004 | Lantto | |
| 9,423,233 B2 | 8/2016 | Holt et al. | |
| 10,392,962 B2 | 8/2019 | Rowe et al. | |
| 2003/0122541 A1 | 7/2003 | Lantto | |
| 2012/0119730 A1 | 5/2012 | Exposito et al. | |
| 2015/0037498 A1 | 2/2015 | Bruck et al. | |
| 2015/0125308 A1 | 5/2015 | Radomski | |
| 2017/0115320 A1 | 4/2017 | Turner | |
| 2018/0003073 A1 | 1/2018 | Rowe et al. | |
| 2018/0010479 A1 | 1/2018 | Mason et al. | |

FOREIGN PATENT DOCUMENTS

| | | |
|---|---|---|
| EP | 0353076 A2 | 1/1990 |
| EP | 1876422 A1 | 1/2008 |
| EP | 2392899 A2 | 12/2011 |
| EP | 3128332 A2 | 2/2017 |
| EP | 3263846 A1 | 1/2018 |
| EP | 3266990 A1 | 1/2018 |
| FR | 2488997 A3 | 2/1982 |
| WO | WO0153774 A1 | 7/2001 |

OTHER PUBLICATIONS

Search Report of the Intellectual Property Office of the United Kingdom for GB1901113.9 with search date of Jul. 29, 2019.

* cited by examiner

SHAFT MONITORING SYSTEM

CROSS-REFERENCE TO RELATED APPLICATIONS

This specification is based upon and claims the benefit of priority from UK Patent Application Number 1901113.9 filed on 28 Jan. 2019, the entire contents of which are incorporated herein by reference.

BACKGROUND

Field of the Disclosure

The present disclosure relates to a shaft monitoring system, and in particular, to a monitoring system for monitoring a rotating shaft of a gas turbine engine.

Description of the Related Art

In a gas turbine engine, impending or actual failure of a shaft or of an axial location bearing of the shaft can be accompanied by axial movement of the shaft. Thus it is desirable to monitor the axial position of such a shaft so that suitable automatic or crew-initiated corrective action, e.g. engine shut down, can be performed to prevent the failure progressing.

Conventionally, phonic wheels and associated sensors are used to measure shaft speed. For example, FIG. 17 shows schematically a phonic wheel 1 having a circumferential row of teeth, and a variable reluctance sensor 2 which detects the passage of the row of teeth by generating an alternating measurement signal. As each tooth of the phonic wheels passes close to the front face of a pole piece of the sensor there is a change in the magnetic flux experienced by a conductive wire wrapped around the pole piece, owing to the change in the reluctance of the magnetic circuit consisting of the pole piece, the phonic wheel and the air gap between the two.

The present invention is at least partly based on a realisation that such an arrangement can be adapted to monitor the axial position of the shaft and indeed other properties associated with the shaft, such as shaft bow and torque.

SUMMARY

According to a first aspect there is provided a monitoring system for monitoring one or more properties associated with a rotating shaft, the system comprising:

a first phonic wheel which is mounted coaxially to the shaft for rotation therewith, the first phonic wheel comprising a circumferential row of teeth;

a first sensor configured to detect the passage of the row of teeth of the first phonic wheel by generating a first alternating measurement signal; and, a processor unit configured to determine the durations of successive first speed samples, each first speed sample being a block of n successive cycles of the first alternating measurement signal, where n is an integer, and in which the beginning of each cycle is a zero-crossing point from the previous cycle and the end of each cycle is the corresponding zero-crossing point to the next cycle; wherein, at at least one axial location of the first phonic wheel every $m^{th}$ tooth of the row of teeth of the first phonic wheel has a circumferential thickness which is different from that of the other teeth of the first phonic wheel, where m is an integer, m≠n, and m is neither a factor nor a multiple of n, whereby when the first sensor is positioned at said axial location of the first phonic wheel and at any given rotational speed of the first phonic wheel, the durations of the successive first speed samples display a characteristic repeating pattern of longer and shorter sample durations relative to the average duration of the successive first speed samples, the amount by which the longer and shorter sample durations differ from the average duration being in proportion to the amount by which the circumferential thickness of the $m^{th}$ teeth differs from that of the other teeth at said axial location of the first phonic wheel; and, the processor unit monitors the properties associated with the rotating shaft from the characteristic repeating pattern.

Advantageously, adopting this approach for monitoring the rotating shaft allows the system to use electronic circuitry that is typically already available in engine electronic controllers (EECs) for making rotational speed measurements. Thus barriers to and costs of implementing the system are low.

Optional features of the monitoring system will now be set out. These are applicable singly or in any combination.

The processor unit may be part of an EEC of the engine.

Typically, the other teeth of the first phonic wheel may be identical to each other.

Typically, the other teeth of the first phonic wheel may comprise a constant circumferential thickness with distance in the axial direction of the shaft. For example, they may comprise a rectangular shape when viewed in the radial direction.

The $m^{th}$ teeth of the first phonic wheel may vary in circumferential thickness with distance in the axial direction of the shaft. For example, at at least one axial position, the circumferential thickness of the $m^{th}$ teeth of the first phonic wheel may be the same as the circumferential thickness of the other teeth of the first phonic wheel at that axial position. One possibility is for the $m^{th}$ teeth of the first phonic wheel to comprise a step change in circumferential thickness at a given axial position. Thus to one side of the step they can be the same circumferential thickness as the other teeth, and to the other side they can be a different circumferential thickness. Another possibility is for the $m^{th}$ teeth of the first phonic wheel to vary continuously in circumferential thickness with distance in the axial direction of the shaft.

The monitored properties associated with the rotating shaft may include the axial position of the shaft. For example, this allows the system to monitor for failure of the shaft or other conditions producing significant shifts in shaft axial position such as fan blade off.

The monitored properties associated with the rotating shaft may include bowing of the shaft.

The monitored properties associated with the rotating shaft include the rotational speed of the shaft.

The monitoring system may further comprise:

a second sensor configured to detect the passage of the row of teeth of the first phonic wheel by generating a second alternating measurement signal; wherein, the processor unit is further configured to determine the durations of successive second speed samples, each second speed sample being a block of n successive cycles of the second alternating measurement signal in which the beginning of each cycle is a zero-crossing point from the previous cycle and the end of each cycle is the corresponding zero-crossing point to the next cycle, whereby when the second sensor is positioned at said axial location of the first phonic wheel and at any given rotational speed of the first phonic wheel, the durations of the successive second speed samples also display the characteristic repeating pattern; and, the processor unit monitors the properties associated with the rotating shaft from the characteristic repeating patterns displayed by the durations of the successive first speed samples and the durations of the successive second speed samples.

By monitoring the properties based on the durations of the first and second speed samples improvements in measurement accuracy can be achieved. Further, the second sensor provides redundancy in case of failure or malfunction of one sensor. Conveniently, the second sensor can be positioned on an opposite side of the first phonic wheel to the first sensor.

The monitoring system may further comprise:

a second phonic wheel which is mounted coaxially to the shaft for rotation therewith, the second phonic wheel comprising a circumferential row of teeth, and the second phonic wheel being axially spaced along the shaft from the first phonic wheel; and, a third sensor configured to detect the passage of the row of teeth of the second phonic wheel by generating a third alternating measurement signal; wherein, the processor unit is further configured to determine the durations of successive third speed samples from the third sensor, each third speed sample being a block of n successive cycles of the third alternating measurement signal in which the beginning of each cycle is a zero-crossing point from the previous cycle and the end of each cycle is the corresponding zero-crossing point to the next cycle;

at at least one axial location every $m^{th}$ tooth of the row of teeth of the second phonic wheel has a circumferential thickness which is different from that of the other teeth the second phonic wheel, whereby when the third sensor is positioned at said axial location of the second phonic wheel and at any given rotational speed of the second phonic wheel, the durations of the successive third speed samples also display the characteristic repeating pattern; and, the processor unit is further configured to determine the relative phase between the characteristic repeating pattern of the first speed samples and the characteristic repeating pattern of the third speed samples, whereby the monitored properties associated with the rotating shaft include twist of the shaft as determined from the relative phase.

Conveniently, n and m for the second phonic wheel are respectively identical to n and m for the first phonic wheel. Similarly, it is convenient for the second phonic wheel to have the same diameter and/or the same total number of teeth as the first phonic wheel.

Optional features relating to the first phonic wheel (e.g. tooth shape, further sensor) pertain also to the second phonic wheel.

According to a second aspect there is provided a gas turbine engine for an aircraft comprising:

an engine core comprising a turbine, a compressor and a core shaft connecting the turbine to the compressor; and, a monitoring system according to the first aspect for monitoring the core shaft, the or each phonic wheel being mounted coaxially to the core shaft for rotation therewith.

According to a third aspect there is provided a gas turbine engine for an aircraft comprising:

an engine core comprising a turbine, a compressor, and a core shaft connecting the turbine to the compressor;

a fan located upstream of the engine core, the fan comprising a plurality of fan blades; and, a gearbox that receives an input from the core shaft and outputs drive to the fan via an output shaft so as to drive the fan at a lower rotational speed than the core shaft;

a thrust shaft that extends through the gearbox to connect the fan to an axial location bearing mounted on the core shaft, thereby relieving the output shaft of responsibility for axially locating the fan relative to the core shaft; and, a monitoring system according to the first aspect for monitoring the axial position of the thrust shaft, the first phonic wheel being mounted coaxially to the thrust shaft for rotation therewith.

In the gas turbine engine of the second or third aspect the turbine may be a first turbine, the compressor may be a first compressor, and the core shaft may be a first core shaft. The engine core may then further comprises a second turbine, a second compressor, and a second core shaft connecting the second turbine to the second compressor. The second turbine, second compressor, and second core shaft can be arranged to rotate at a higher or lower rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105

Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
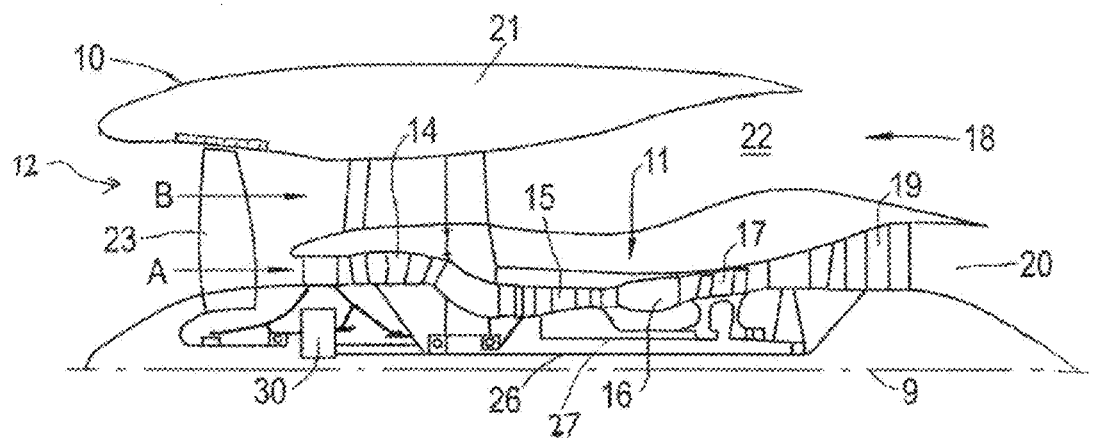
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
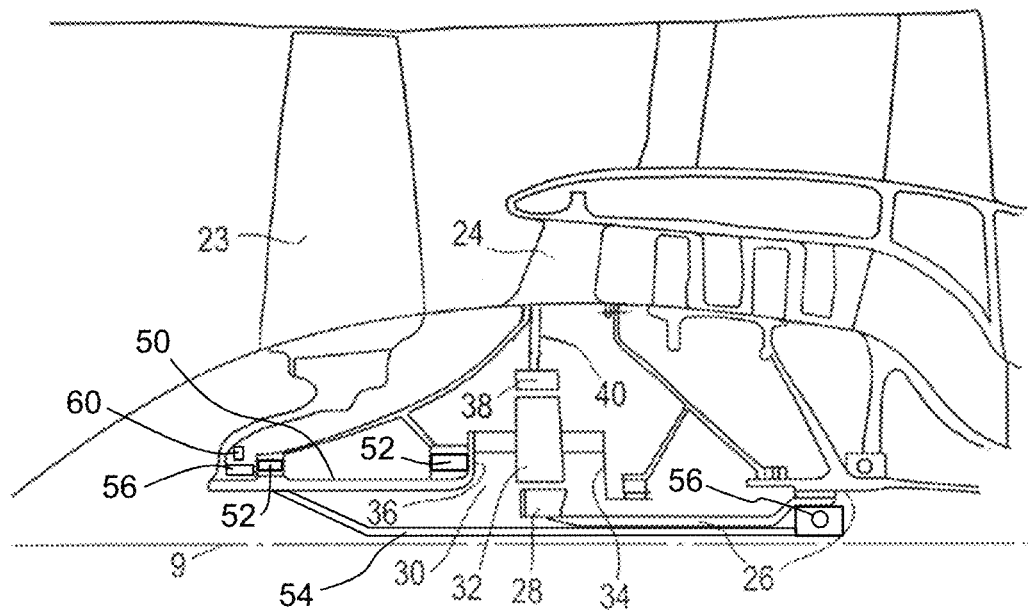
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
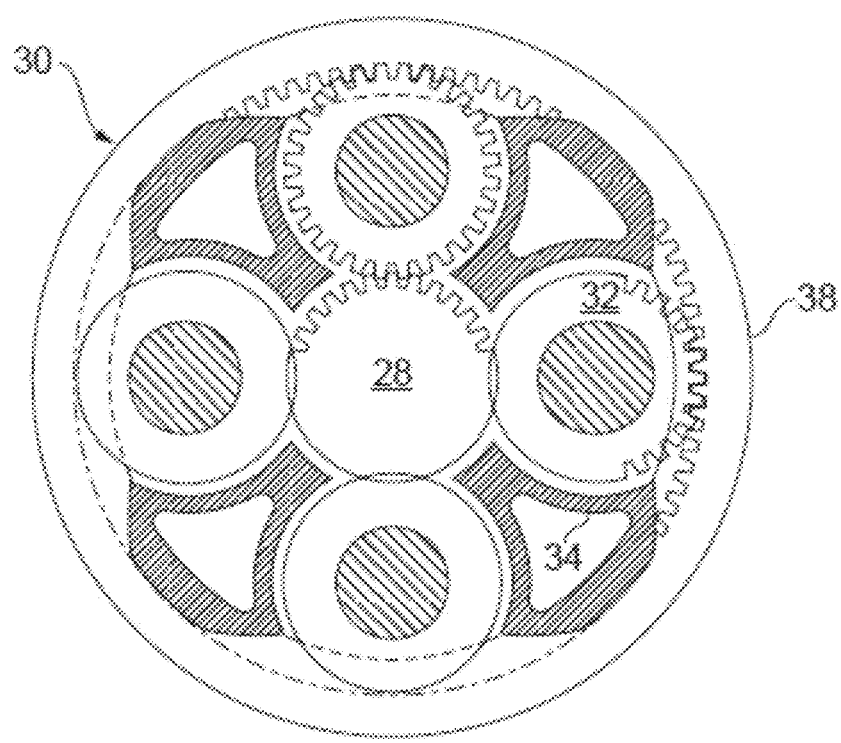
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the exemplary arrangement for a geared fan gas turbine engine 10 shown in FIG. 2, the output shaft 50 from the epicyclic gear arrangement 30 is radially located at each end by sets of roller bearings 52. These allow the shaft to transmit torque to the fan 23, but do not provide significant axial retention functionality. To axially retain the output shaft 50 and the fan 23, a separate thrust shaft 54 extends from a set of ball bearings 56 attached to the interconnecting shaft 26, through the centre of the sun gear 28 to join to the output shaft 50. Thus torque transmission and axial retention responsibilities are split between the output shaft 50 and the thrust shaft 54.

Failure of the thrust shaft 54 or the ball bearings 56 can endanger the engine, and thus it is desirable to have early detection of any axial displacement of the shaft 54. Accordingly, the engine also has a monitoring system for monitoring the axial position of the shaft. This system comprises a first phonic wheel 56. Conveniently this can be mounted at the front of the output shaft 50 coaxially with the thrust shaft 54. At this location it co-rotates with the entire assembly of the fan 23, output shaft 50 and thrust shaft 54.

The first phonic wheel 56 has a circumferential row of teeth whose passage is detected by a first variable reluctance speed probe 60 mounted to a stationary structure of the engine.

Speed Measurement

Figure 4:
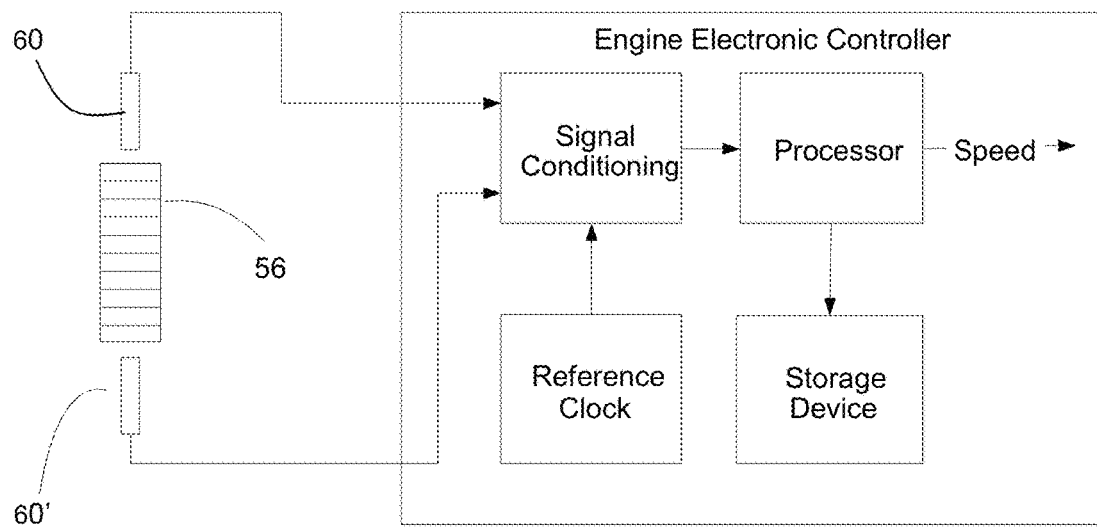
FIG. 4 shows schematically a speed measurement system using a phonic wheel and speed probes.
Figure 5:
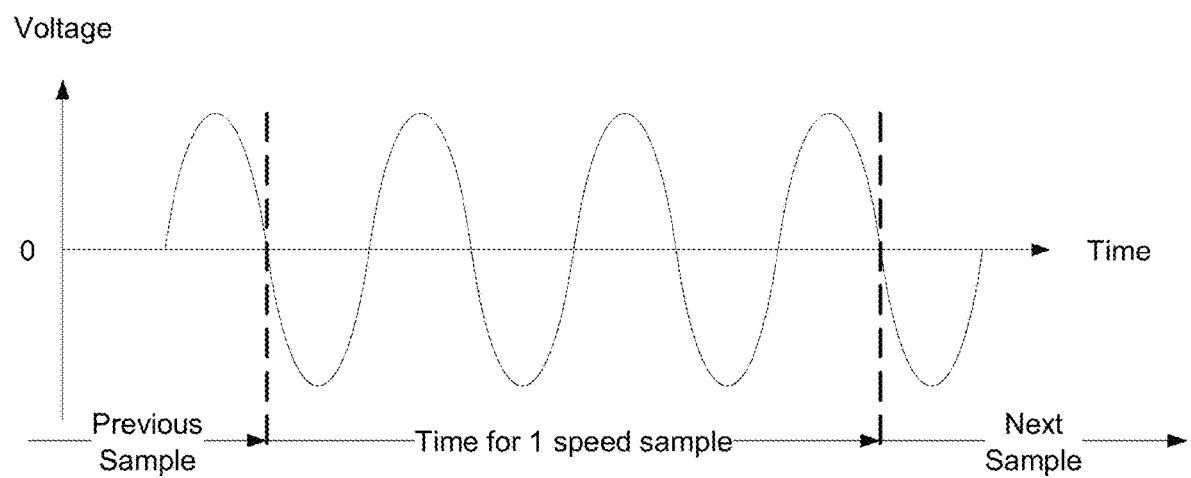
FIG. 5 shows schematically an alternating measurement signal produced by a speed probe.

A speed measurement system using the first phonic wheel 56 and the first speed probe 60 is shown schematically in FIG. 4. Although not shown in FIG. 2, the system may comprise a second variable reluctance speed probe 60' positioned on the opposite side of the first phonic wheel 56. The phonic wheel has plural regularly spaced square edged teeth and a diameter d. If the teeth on the wheel were identical and of uniform circumferential thickness, for any axial position of the probes relative to the wheel the rotation of the phonic wheel past each probe would induce a respective alternating measurement signal having a sinusoidal wave pattern, as shown in FIG. 5. The speed measurement system (typically embodied as part of the engine electronic controller—EEC) has a signal conditioning function which detects zero crossings and uses a reference clock to measure the time for a speed sample of n successive complete cycles (the beginning of each cycle being a zero-crossing point from the previous cycle and the end of each cycle being the corresponding zero-crossing point to the next cycle). A processor of the EEC then uses this timing information to derive the rotational speed of the thrust shaft 54 and fan 23. In FIG. 5 each speed sample is shown made up of n=3 successive cycles. The two probes 60, 60' provide redundancy, and in other set ups may be useful for shaft bow detection (discussed below).

Axial Position Detection

For speed measurement, the axial thickness of a phonic wheel can be set to accommodate normal expansion and contraction of the rotating and static engine structures over the range of engine operations.

Figure 6:
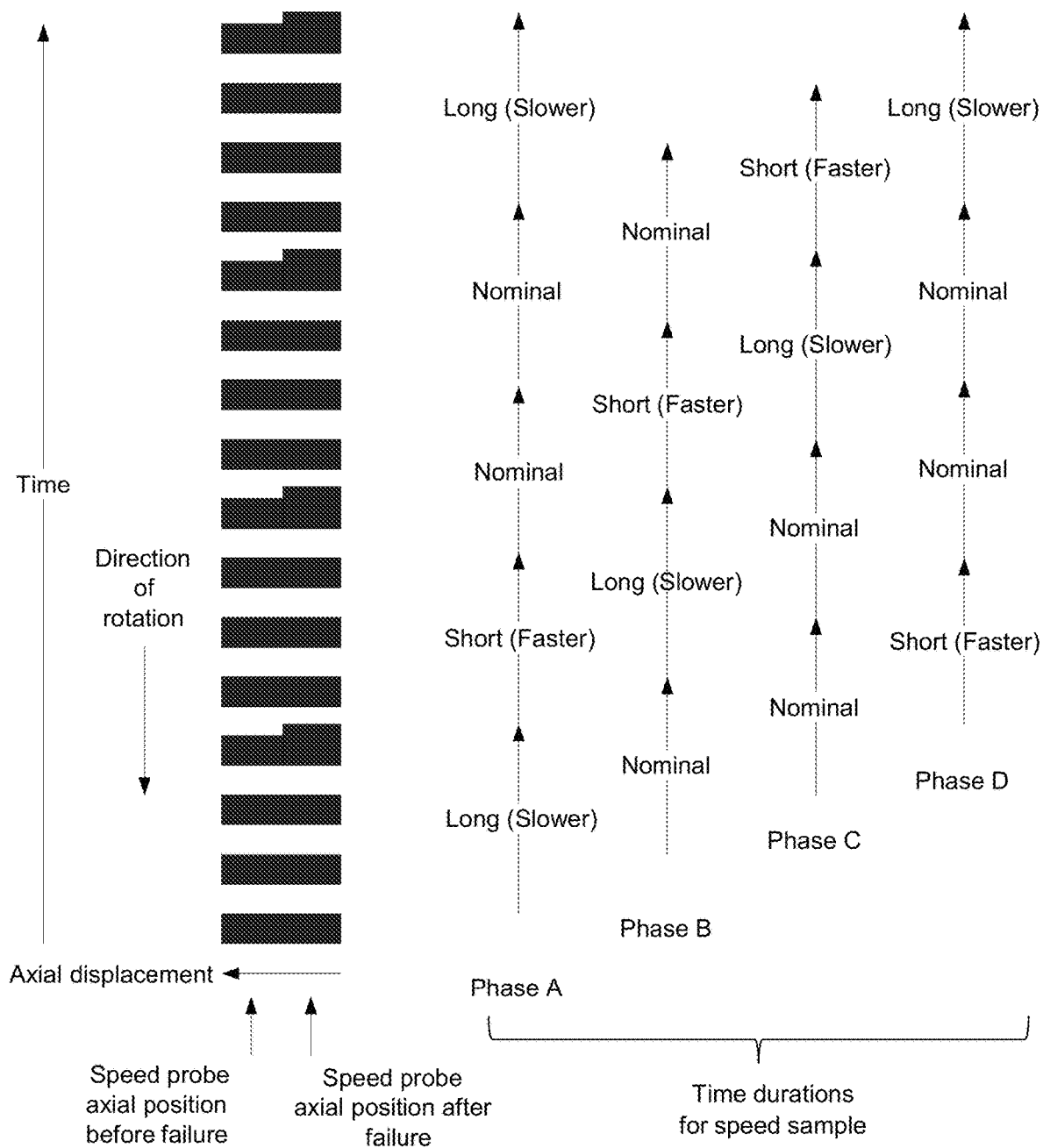
FIG. 6 shows schematically a portion of the circumferential row of teeth of a phonic wheel with at left a section of the wheel encountered by a speed probe during normal operation before shaft failure and at right a section of the wheel encountered by the probe on shaft failure.

However, failure of the thrust shaft 54 causes the phonic wheel 56 to move forward, relative to the probes 60, 60'. Thus for detection of such events, the speed measurement system can be modified by increasing the axial thickness of the wheel such that on axial movement above a predetermined threshold distance, the speed probes are exposed to a new section of the phonic wheel not normally encountered by the probes. FIG. 6 shows schematically the circumferential row of teeth with at left the section of the wheel encountered by each probe during normal operation before shaft failure and at right the section of the wheel encountered by each probe on shaft failure. In the right hand section every $m^{th}$ tooth of the wheel is increased in circumferential thickness, where m≠n, and is neither a factor nor a multiple of n. In the example of FIG. 6, n=3 and m=4.

A result of the change in circumferential thickness of the teeth in the right hand section of the wheel 56 is that the zero-crossing point between cycles is shifted when that zero-crossing point coincides with the edge of a thickened tooth. Therefore, at any given rotational speed of the wheel, the durations of the successive speed samples detected by each probe 60, 60' display a characteristic repeating pattern of longer and shorter sample durations relative to the average or "nominal" duration of the samples, the amount by which the longer and shorter sample durations differ from the average duration being in proportion to the amount by which the circumferential thickness of the $m^{th}$ teeth differs from that of the other teeth.

In particular, for the example of speed samples made up of n=3 successive cycles, and every $m=4^{th}$ tooth of the wheel being increased in circumferential thickness, the sample durations follow a characteristic repeating pattern at any given speed of: Nominal, Nominal, Slower, Faster, Nominal. This pattern is exhibited whatever the phase of the start of the pattern, as shown in FIG. 6.

The step change in the circumferential thickness of the $m^{th}$ teeth between the two sections of the wheel can be set so that the difference in durations between Nominal and Slower, and between Nominal and Faster corresponds to a speed measurement that exceeds the accuracy limits of speed measurement of the speed measurement system. In this way, the characteristic repeating pattern is not hidden by limitations on measurement accuracy.

To further ensure that the characteristic repeating pattern is reliably detected, the change in measured speed represented by the transition between Nominal and Slower durations, and between Nominal and Faster durations can be set to a rate greater than the engine can physically accelerate or decelerate within n tooth counts.

If the shaft 54 fails during a transient manoeuvre the system can correct for the transient component by determining the gradient between the Nominal duration readings either side of the Slower and Faster duration readings. The mean of the Slower and Faster duration readings can be expected to lie on the gradient line between the Nominal duration readings. This mean provides an actual speed measurement and can be applied as a correction to the Slower and Faster duration readings in calculation of axial displacement.

Having said that, transient manoeuvres are normally secondary effects. A typical sequence of speed samples is taken over 0.2 of a rotation (e.g. on a 60 tooth phonic wheel), which represents a small change in physical shaft speed, relative to a typical transient of 5% of shaft speed per sec.

Bow Detection

Figure 7:
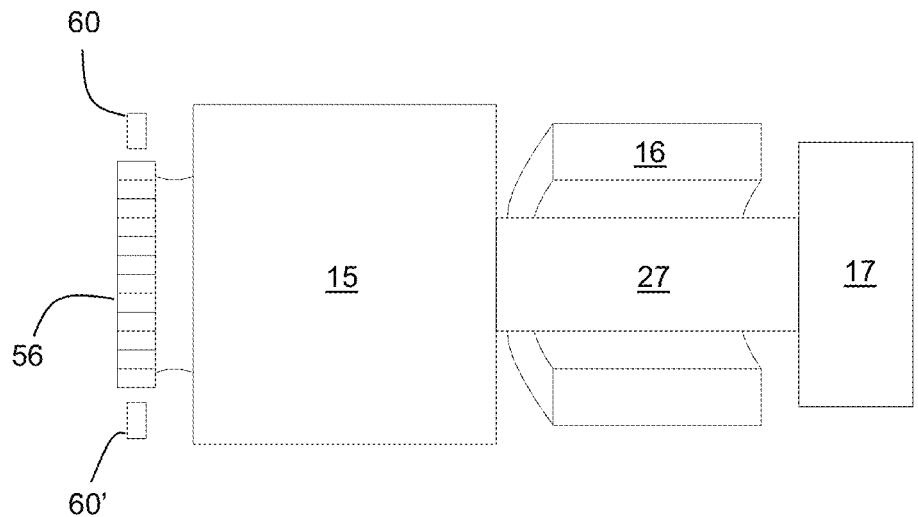
FIG. 7 shows schematically a spool of an engine and associated phonic wheel and speed probes for measuring rotor bow.

When a spool (i.e. a given turbine-shaft-compressor combination) has a uniform temperature then the spool is balanced. Achieving balance is particularly important for high-pressure spools, such as the compressor 15, shaft 27 and turbine 17 of the engine 10 shown in FIG. 1, which are strongly exposed to shutdown soak back from the combustion equipment 16. If a phonic wheel 56 is mounted on an end of such a spool, the relative position between the wheel and opposing top and bottom speed probes 60, 60' for a balanced spool is as shown in FIG. 7, with both probes detecting the teeth of the wheel at the same axial position of the wheel.

Figure 8:
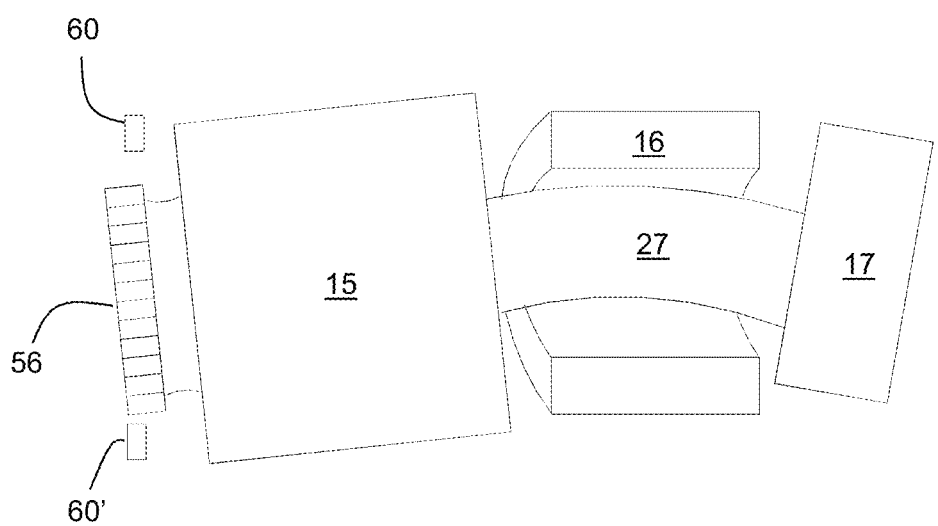
FIG. 8 shows schematically the spool of FIG. 7 bowed due to shutdown soak back.

After shutdown, soak back bows the spool, as shown in exaggerated form in FIG. 8. This bowing causes displacement of the phonic wheel 56 relative to the probes 60, 60'. In particular, one of the probes detects the teeth at an axially more forward part of the wheel, and the other probe detects the teeth at an axially more rearward part of the wheel.

Figure 9:
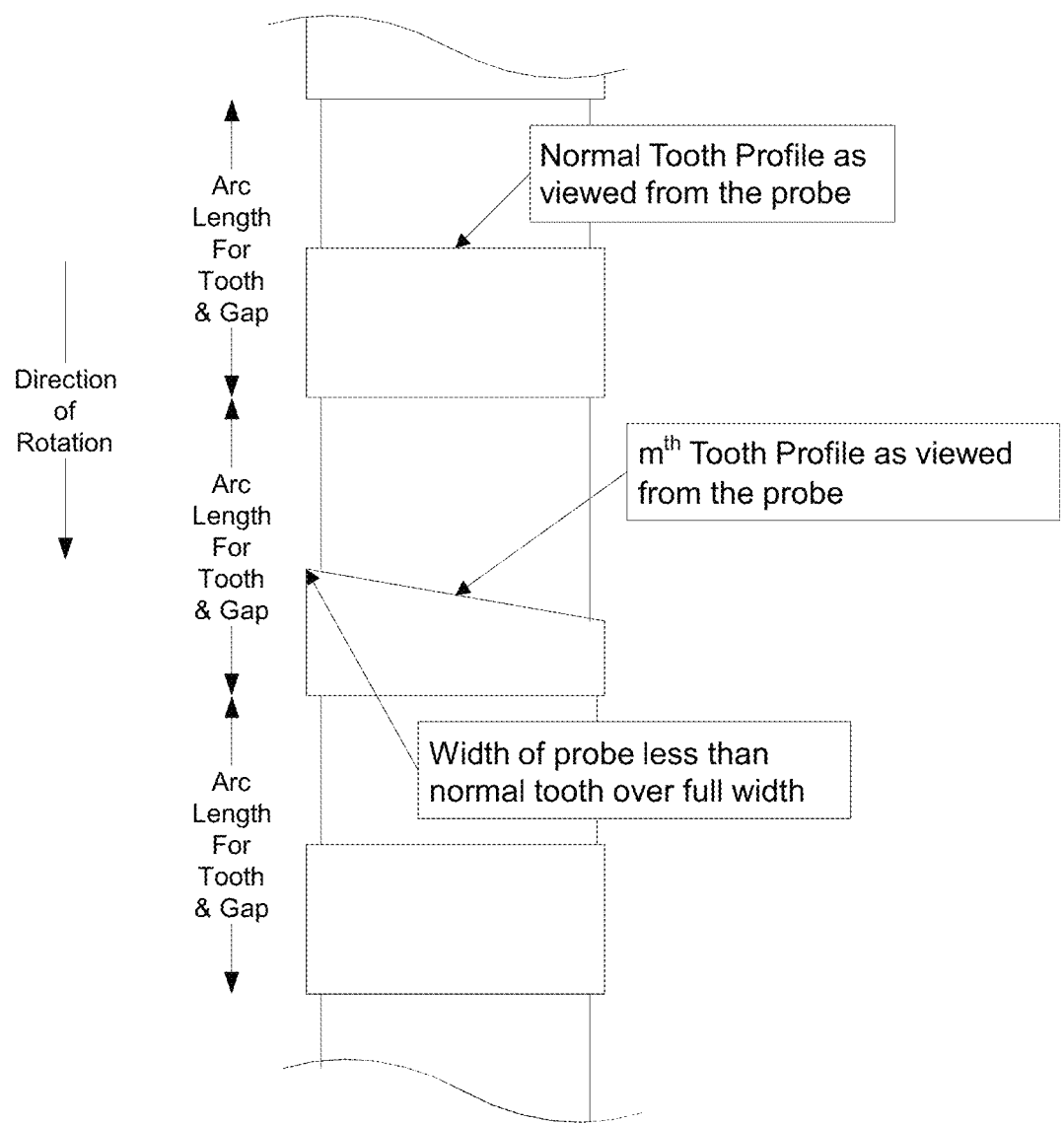
FIG. 9 shows schematically a portion of the circumferential row of teeth of a phonic wheel.

Consequently, if the $m^{th}$ teeth (in the context of speed samples made up of n successive cycles) vary in circumferential thickness with distance in the axial direction of shaft, then the displacement at each probe 60, 60' can be detected by a change in speed measurement. The changing circumferential thickness for an $m^{th}$ tooth is illustrated in FIG. 9, for m=4 and n=3.

Figure 10:
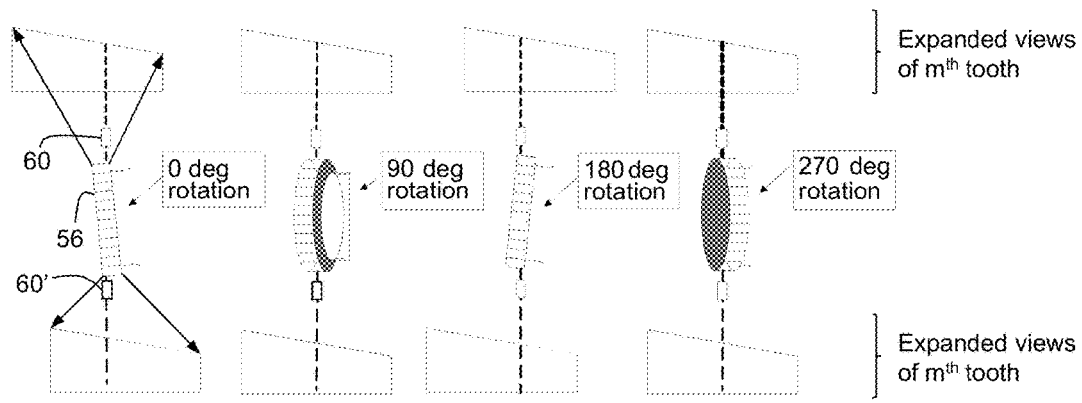
FIG. 10 shows schematically relative orientations of the phonic wheel and speed probes of FIG. 8 for different rotational positions of the spool.

The effect of successive 90° rotations on the phonic wheel 56 to the axial positions of its $m^{th}$ teeth detected by the probe 60, 60' is illustrated in FIG. 10, the dashed vertical lines indicating the crossing locations of the $m^{th}$ teeth across the probes. From FIG. 10, it is evident that the following properties may be used to indicate the magnitude of the out-of-balance caused by bowing.

a. Without rotation, the engine stabilises with the phonic wheel 56 offset axially forwards at the top relative to the static structure (0° rotation in FIG. 10). A thinner part of an $m^{th}$ tooth is detected by the top probe 60.

b. In addition, the bottom of the phonic wheel is offset axially rearwards. A thicker part of an $m^{th}$ tooth is detected by the lower probe 60'.

c. On rotation through 90° and 270°, which can be derived from tooth count as the number of teeth of the phonic wheel is known, both speed probes detect nominal thicknesses for $m^{th}$ teeth.

d. On rotation through 180° properties a) and b) are reversed.

Accordingly, both probes exhibit the characteristic repeating pattern of speed sample durations, but adapted so that in the repeating pattern from any given probe, what was a Faster duration ($t_f$) at 0° rotation becomes a Slower duration ($t_s$) at 180° rotation, and conversely what was a Slower duration at 0° rotation becomes a Faster duration at 180° rotation, with the changeover from Faster to Slower and Slower to Faster occurring at 90° rotation and 270° rotation by going through the Nominal duration ($t_n$). At a given rotational speed, $t_n$ is the same at all rotational positions, being equal to $(t_f+t_s)/2$ at a given rotational position.

The movement of the phonic wheel 56 relative to the locations of the speed probes 60 60', and the physical properties of the wheel provide an indication of the amount of out-of-balance (OOB). In effect the phonic wheel 56 has a known diameter, d, and the change in axial location (offset) picked up by the probes 60 60', which form opposite and adjacent measurements for a pair of right-angled triangles allows the movement of the centre point from its nominal position to be approximated.

For calculation of the amount of OOB caused by bowing, the phonic wheel 56 can be treated as a solid element, with the location of the wheel at the end of the spool allowing axial displacement caused by thermal expansion at the top of the spool to be treated as a secondary effect compared to axial displacement caused by bowing. For a given probe 60, 60', the nominal location of the wheel (i.e. when $t_f=t_s=t_n$) is given twice per rotation (at 90° and 270° in FIG. 10). Knowing the following reference properties of the system:

Gradient of circumferential thickness of the $m^{th}$ teeth (mm of thickness/mm of offset)=k Number of teeth on the phonic wheel=N Diameter of phonic wheel=d (mm)

Number of teeth in a speed sample=n

Frequency of control system reference clock=F (Hz)

allows the OOB to be calculated. In particular, a rotational speed of the wheel of Xn rpm=Xn/60 rps implies a rotation speed R at the tooth limit in mm/sec of:

$$R = \frac{Xn}{60} \cdot \pi d$$

This implies the time for a Nominal sample $t_n$ is given by:

$$t_n = \frac{n\pi d}{N.R}$$

which represents the time required for the phonic wheel to rotate the distance of three teeth past each probe 60 60'.

However, there is a minimum time interval at which the EEC can detect a zero crossing, such that any change in time less than that interval is not detected as any difference in balance, this time of resolution $t_r$ is given by $$t_r = \frac{1}{F}$$

An effect is that at low speeds the sensitivity to $t_r$ may be significant as the duration of travel as part of a sample may be difficult to distinguish from displacement. by:

Resolution=$Rt_r$.

This represents the minimum offset that the system can detect against the speed of rotation and also the sensitivity to each clock sample. However, in this mode, the difference being measured is between standard Slower and Faster sample times which represent the offset for the measurement during balanced rotation.

So, given a difference in time $\Delta t=t_n-t_f=t_s-t_n$, $\Delta t$ shows a cycle of maximum OOB position (0° and 180° in FIG. 10) and minimum OOB position (90° and 270° in FIG. 10). The control software monitors the cycle of data captured to determine the maximum magnitude of difference over a rotation, $\Delta t_{max}$ which allows the wheel maximum axial offset at the probe to be determined as:

$$\text{Offset} = \frac{R.\Delta t_{max}}{k}$$

which, from application of Pythagoras, allows the OOB to calculated as:

OOB=$(0.25 \times d^2+\text{Offset}^2)^{1/2}$

Additionally, the minimum resolution in OOB, MinOOB, in mm at a speed of Xn for OOB is given by:

Min OOB=$(0.25 \times d^2+\text{Resolution}^2)^{1/2}$

Thus during an engine start, the EEC can read the differences between Faster and Slower sample durations detected by one probe 60 as a cycle of rotation phase as the phonic wheel rotates. The second probe 60' 180° apart from the first probe should provide the same readings, but 180° out of phase. The start can thus be controlled in a closed loop to allow thermal stabilisation. As the spool reaches a thermal equilibrium, the amount of OOB reduces, allowing continued acceleration. Moreover, the phase differential between the readings from the two probes reduces, providing further indication that the balance is being restored and that the spool can be accelerated without excessive vibration.

Twist Measurement

Figure 11:
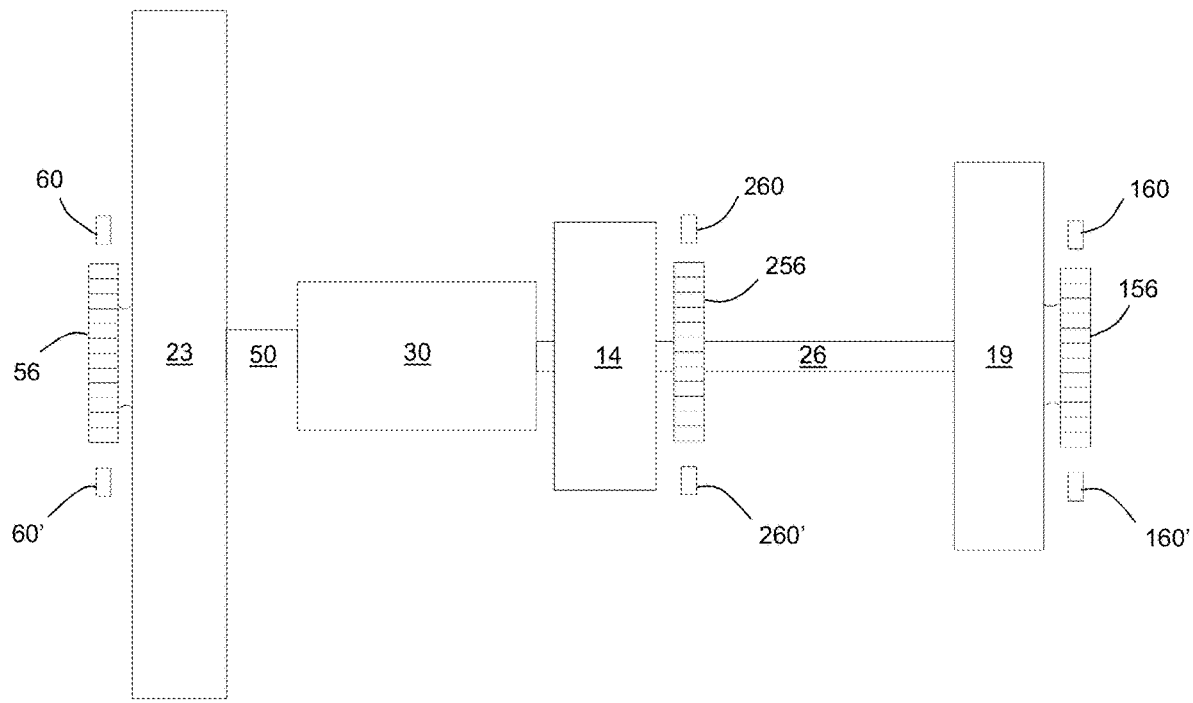
FIG. 11 shows schematically the fan, output shaft, power gearbox, and low pressure spool of an engine with associated phonic wheels and speed probes for measuring shaft twist.

During engine running a twist is present on the interconnecting shafts 26, 27 from the work done on the respective turbine 17, 19 and the drag of the work done by the respective compressor 14, 15 and, in the case of the interconnecting shaft 26, also done by the fan 23. A twist (and hence torque) measurement system can be configured by using a measurement system as shown in FIG. 11 in the context of the fan 23, output shaft 50, power gearbox 30, low pressure compressor 14, interconnecting shaft 26 and low pressure turbine 19 of FIGS. 1 and 2.

More particularly, a first phonic wheel 56 and respective opposing speed probes 60, 60' are provided at the front of the fan system, similar to the speed measurement system shown in FIGS. 2 and 4. However, in addition, a second phonic wheel 156 and respective opposing third and fourth speed probes 160, 160' are installed adjacent to the low pressure turbine. The second phonic wheel can be located in front or behind the low pressure turbine without affecting the measurement. Optionally a third phonic wheel 256 and respective opposing fifth and sixth speed probes 260, 260' can be installed adjacent to the low pressure compressor 14 to enhance measurement accuracy.

Each phonic wheel 56, 156, 256 has the same number of teeth, with every $m^{th}$ tooth of each wheel having a circumferential thickness which is distinguishably different from that of the other teeth of that wheel in order to produce the characteristic repeating pattern of longer and shorter speed sample durations.

During engine operation, the work done by the low pressure turbine 19 generates a torque to drive the low pressure compressor 14, power gearbox 30 and fan 23. Due to elastic properties of the shafts 26, 50 the torque causes a in each shaft given by $k\theta$, where k is the respective elastic constant for shaft twist and $\theta$ is the angle of rotation caused by shaft twist.

Figure 12:
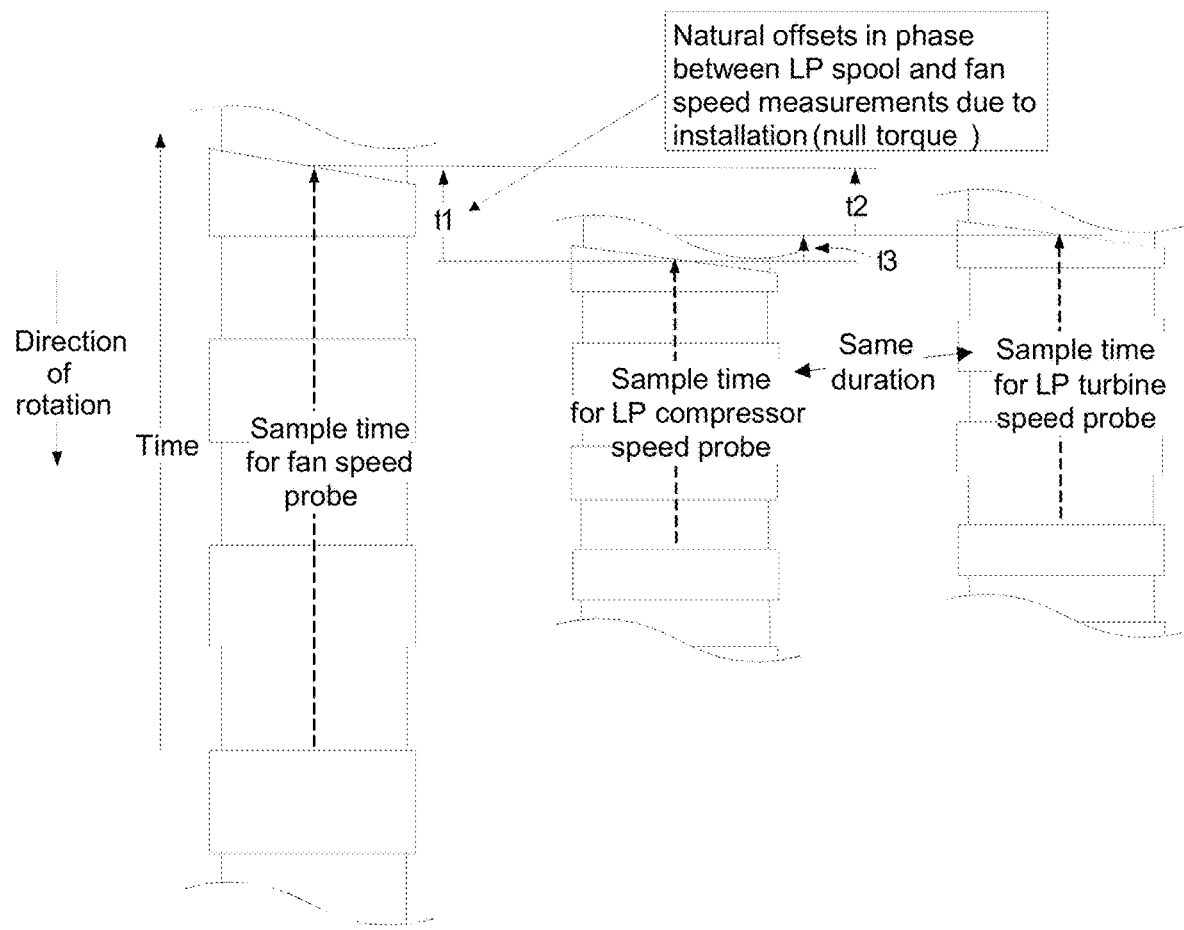
FIG. 12 shows schematically portions of the circumferential rows of teeth of the phonic wheels of FIG. 11.
Figure 13:
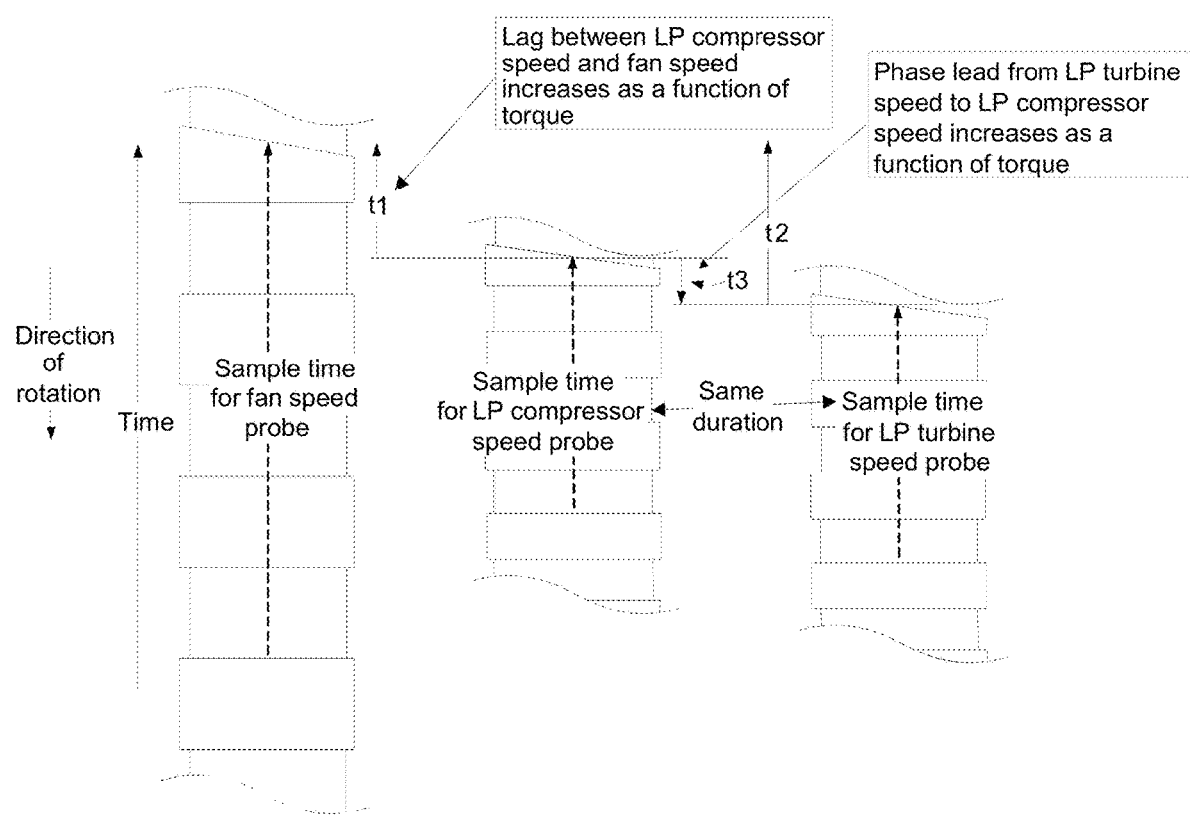
FIG. 13 shows the portions of the circumferential rows of teeth FIG. 12 under the effect of torque.

The measurement system operates by capturing the relative time difference between $m^{th}$ tooth samples on each phonic wheel 56, 156, 256, and from the known mechanical properties of the shafts and gearbox. The known geometrical features of the phonic wheels can be used to measure twist and also to distinguish twist from effects due to thermal expansion. The EEC has a record of the relative orientations between the phonic wheels at assembly and under no torque, or very low torque, which provides a reference for subsequent measurements (i.e. $\theta$=0). This is illustrated in FIG. 12. The effect of torque against the reactive force of the LP compressor, power gearbox and fan system is then illustrated in FIG. 13.

Figure 14:
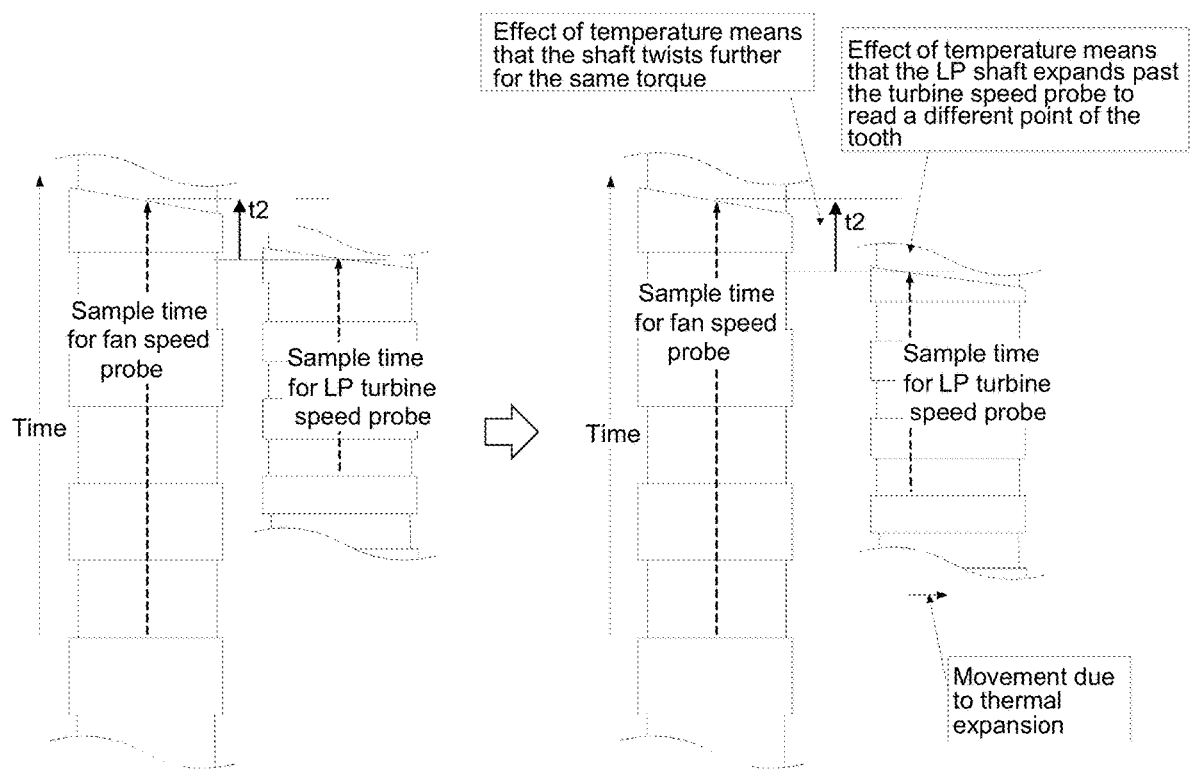
FIG. 14 shows portions of the circumferential rows of teeth of the phonic wheels located at the fan and the low pressure turbine before and after a temperature increase.

Temperature variation along the shafts can complicate the twist measurement. This variation produces variation in k (k reducing as the temperature increases). In addition, it cause the shafts to expand or contract. However, the phonic wheels can be configured to enable compensation of these effects. Thus FIG. 14 shows at left a phase lead t2 between the wheel 56 at the fan 23 and the wheel 156 at the turbine 19. At right are the same wheels after a temperature increase along the shafts. This increase causes the LP turbine phonic wheel 156 to shift axially probe detection position is at an axially more forward location on the wheel. When the circumferential thickness of the $m^{th}$ teeth varies with distance in the axial direction of the shaft (as shown in FIG. 14) this shift in probe position can be determined from variation in $\Delta t = t_n - t_f = t_s - t_n$. At the same time, the decrease in k caused by the temperature increase causes the shafts to twist further for a given torque, resulting in an increase in t2. The thermal expansion measured by variation in $\Delta t$ can be used, typically in combination with other temperature measurements, to determine the temperature profile along the shafts, and thus k variation along the shafts and thereby torque.

While the primary effect of thermal expansion are on the shaft 26, the static engine structure holding the speed probes 60, 60', 160, 160', 260, 260' is also subject to thermal dilation over the range of engine operating conditions. However, such characteristics can be captured during engine development programmes and compensation suitably applied to the measurement of torque. Additionally or alternatively, at engine pass off a calibration curve for the engine torque at a speed can be captured against testbed thrust measurement systems and the settings for the shaft and static structure expansion can be captured as an engine-specific calibration.

Figure 15:
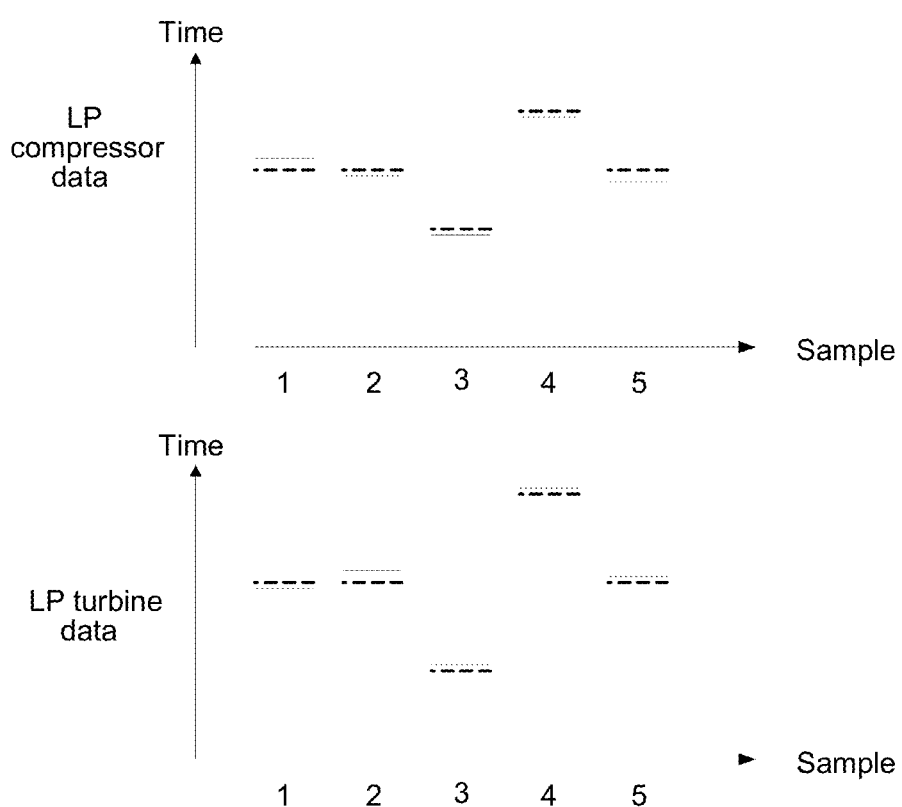
FIG. 15 shows schematically at top a series of speed samples from the low pressure compressor and at bottom a corresponding series of speed samples from the low pressure turbine.

When operating at power conditions in which the shaft 26 is not a mechanically stiff component, it will have a torsional oscillation component that affects the time of each speed measurement and the magnitude of the torque measurement. The impact on a series of speed samples between the low pressure compressor 14 and low pressure turbine 19 is illustrated in FIG. 15, which shows schematically at top a series of fives speed samples (three with Nominal durations of $t_n$, one with a Faster duration $t_f$ and one with a Slower duration $t_s$) from the phonic wheel 256 for the low pressure compressor 14, and at bottom the corresponding series of fives speed samples from the phonic wheel 156 for the low pressure turbine 19. The expected durations of the speed sample are indicated with dashed lines, and the actual measured durations of the speed sample are indicated with solid lines. When using identical phonic wheels and in the absence of shaft oscillation, pairs of speed samples with durations of $t_n$ taken at identical sample times should be the same as between the LP compressor and the LP turbine data. However, the effect of shaft oscillation is to cause the measured speed samples of such pairs to vary from each other, e.g. in FIG. 15 the measured $t_n$ for Sample 1 is above the expected line for the LP compressor data, but below the line for the LP turbine data.

The above analysis assumes identical phonic wheels. Where the phonic wheels 156, 256 differ in the number of teeth, or m to n ratios, the signals need scaling to align nominal speed samples.

The effect of torsional oscillation appears as a change in measured torque. This can be compensated for by use of the property that $t_n = (t_f + t_s)/2$ as the error from $t_n$ indicates the magnitude due to torsional oscillation, or other noise sources. In summary, torsional oscillation, or other noise sources, change the Faster and Slower durations from the expected Nominal duration, such that noise can be mitigated by taking the mean of a number of samples.

The system can be used to measure twist can be used to measure twist within a single shaft, such as the output shaft 50 or interconnecting shaft 26. Alternatively it can measure twist from the fan 23 to the low pressure turbine 19, i.e. through both shafts 26, 50 and across the gearbox 30. In this case the system can be improved by the inclusion of a low pressure compressor speed measurement to allow a determination of the torque within the shaft 26.

General Advantages

All the detection/measurement approaches discussed above can advantageously make use of electronic circuitry that is typically already available in EECs for rotational speed measurements. Moreover phonic wheels and associated speed probes are proven technology, which are reliable, robust and accurate in operation.

Variants

In FIG. 6 the circumferential thickness of the $m^{th}$ teeth is shown increased in the right hand section of the wheel relative to the other teeth. However, an alternative is to reduce the thickness of the $m^{th}$ teeth, changing the repeating pattern of speed measurements for a steady state measurement to: Nominal, Nominal, Faster, Slower, Nominal.

In FIGS. 6, 7 and 11, the speed probes are shown at the top and bottom of the measurement plane. However, as the engine static structure is also subject to a bow effect (although less than that to which the high pressure spool is subject) another option is to locate the speed probes at the midpoint of the engine to remove the effect of static structure thermal bow.

Indeed, fitment of speed probes at the sides and top and bottom locations allows determination of static structure bow by difference to the side measurement to support characterisation during engine development. In particular, offset measurements taken with the side location can be compared with offset measurements taken at the top and bottom locations. However, there is a resolution limit associated with the sensitivity of the measurement system below which the static structure bow will not be detectable.

Figure 16:
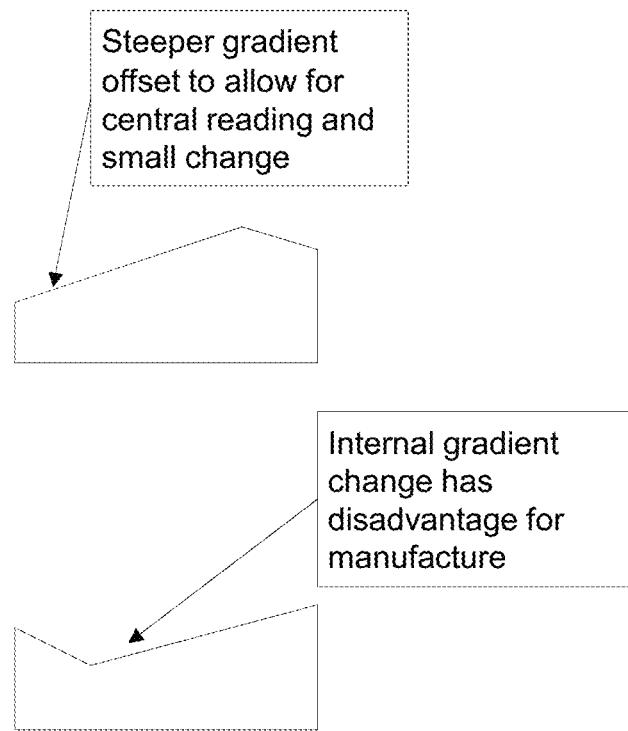
FIG. 16 shows schematically at top and bottom two variant teeth each comprising a split gradient circumferential thickness configuration; and, FIG. 17 shows schematically a conventional phonic wheel comprising a circumferential row of teeth, and a variable reluctance sensor.
Figure 17:
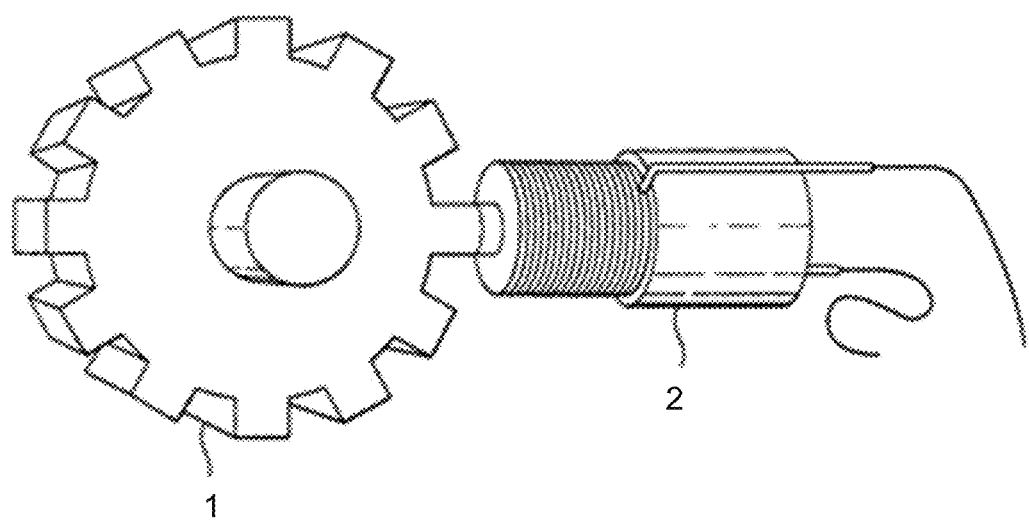

Measurement sensitivity can be increased in various ways, such as:

Increasing the amount by which the $m^{th}$ teeth vary in circumferential thickness with axial distance. For example, this can be achieved without substantially increasing the maximum circumferential thickness of the teeth by adopting a split gradient configuration in the thickness of $m^{th}$ teeth, as shown for example in two possible variants in FIG. 16.

Increasing the diameter of the phonic wheel to increase the circumferential thickness of the teeth for the same number of teeth. However, this has disadvantages of increased weight and increased speed of tooth passing.

Reducing the number of teeth on the phonic wheel. However, this has a disadvantage that the minimum speed for signal availability is increased.

Increasing the reference clock frequency during the start cycle to increase the resolution for out of balance.

If one or more of the $m^{th}$ teeth are further varied in circumferential thickness relative to the other $m^{th}$ teeth this can be used to give a frame of reference signal from which other displacements can be measured.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A monitoring system for monitoring one or more properties associated with a rotating shaft, the system comprising:
    a first phonic wheel which is mounted coaxially to the shaft for rotation therewith, the first phonic wheel comprising a circumferential row of teeth;
    a first sensor configured to detect the passage of the row of teeth of the first phonic wheel by generating a first alternating measurement signal; and,
    a processor unit configured to determine the durations of successive first speed samples, each first speed sample being a block of n successive cycles of the first alternating measurement signal, where n is an integer, and in which the beginning of each cycle is a zero-crossing point from the previous cycle and the end of each cycle is the corresponding zero-crossing point to the next cycle; wherein, at at least one axial location of the first phonic wheel every $m^{th}$ tooth of the row of teeth of the first phonic wheel has a circumferential thickness which is different from that of the other teeth of the first phonic wheel, where m is an integer, m≠n, and m is neither a factor nor a multiple of n, whereby when the first sensor is positioned at said axial location of the first phonic wheel and at any given rotational speed of the first phonic wheel, the durations of the successive first speed samples display a characteristic repeating pattern of longer and shorter sample durations relative to the average duration of the successive first speed samples, the amount by which the longer and shorter sample durations differ from the average duration being in proportion to the amount by which the circumferential thickness of the $m^{th}$ teeth differs from that of the other teeth at said axial location of the first phonic wheel; and, the processor unit monitors the properties associated with the rotating shaft from the characteristic repeating pattern.

2. The monitoring system as claimed in claim 1, wherein the other teeth of the first phonic wheel are identical to each other.

3. The monitoring system as claimed in claim 1, wherein the other teeth of the first phonic wheel comprise a constant circumferential thickness with distance in the axial direction of the shaft.

4. The monitoring system as claimed in claim 1, wherein the $m^{th}$ teeth of the first phonic wheel vary in circumferential thickness with distance in the axial direction of the shaft.

5. The monitoring system as claimed in claim 4, wherein at at least one axial position the circumferential thickness of the $m^{th}$ teeth of the first phonic wheel is the same as the circumferential thickness of the other teeth of the first phonic wheel at that axial position.

6. The monitoring system as claimed in claim 4, wherein the $m^{th}$ teeth of the first phonic wheel comprise a step change in circumferential thickness at a given axial position.

7. The monitoring system as claimed in claim 4, wherein the $m^{th}$ teeth of the first phonic wheel vary continuously in circumferential thickness with distance in the axial direction of the shaft.

8. The monitoring system as claimed in claim 1, wherein the monitored properties associated with the rotating shaft include the axial position of the shaft.

9. The monitoring system as claimed in claim 1, wherein the monitored properties associated with the rotating shaft include bowing of the shaft.

10. The monitoring system as claimed in claim 1, wherein the monitored properties associated with the rotating shaft include the rotational speed of the shaft.

11. The monitoring system as claimed in claim 1, further comprising:
    a second sensor configured to detect the passage of the row of teeth of the first phonic wheel by generating a second alternating measurement signal; wherein,
    the processor unit is further configured to determine the durations of successive second speed samples, each second speed sample being a block of n successive cycles of the second alternating measurement signal in which the beginning of each cycle is a zero-crossing point from the previous cycle and the end of each cycle is the corresponding zero-crossing point to the next cycle, whereby when the second sensor is positioned at said axial location of the first phonic wheel and at any given rotational speed of the first phonic wheel, the durations of the successive second speed samples also display the characteristic repeating pattern; and, the processor unit monitors the properties associated with the rotating shaft from the characteristic repeating patterns displayed by the durations of the successive first speed samples and the durations of the successive second speed samples.

12. The monitoring system as claimed in claim 1, further comprising:

a second phonic wheel which is mounted coaxially to the shaft for rotation therewith, the second phonic wheel comprising a circumferential row of teeth, and the second phonic wheel being axially spaced along the shaft from the first phonic wheel; and, a third sensor configured to detect the passage of the row of teeth of the second phonic wheel by generating a third alternating measurement signal; wherein, the processor unit is further configured to determine the durations of successive third speed samples from the third sensor, each third speed sample being a block of n successive cycles of the third alternating measurement signal in which the beginning of each cycle is a zero-crossing point from the previous cycle and the end of each cycle is the corresponding zero-crossing point to the next cycle;

at at least one axial location every $m^{th}$ tooth of the row of teeth of the second phonic wheel has a circumferential thickness which is different from that of the other teeth the second phonic wheel, whereby when the third sensor is positioned at said axial location of the second phonic wheel and at any given rotational speed of the second phonic wheel, the durations of the successive third speed samples also display the characteristic repeating pattern; and, the processor unit is further configured to determine the relative phase between the characteristic repeating pattern of the first speed samples and the characteristic repeating pattern of the third speed samples, whereby the monitored properties associated with the rotating shaft include twist of the shaft as determined from the relative phase.

13. A gas turbine engine for an aircraft comprising:

an engine core comprising a turbine, a compressor and a core shaft connecting the turbine to the compressor; and, a monitoring system as claimed in claim 1 for monitoring the core shaft, the or each phonic wheel being mounted coaxially to the core shaft for rotation therewith.

14. A gas turbine engine for an aircraft comprising:

an engine core comprising a turbine, a compressor, and a core shaft connecting the turbine to the compressor;

a fan located upstream of the engine core, the fan comprising a plurality of fan blades; and, a gearbox that receives an input from the core shaft and outputs drive to the fan via an output shaft so as to drive the fan at a lower rotational speed than the core shaft;

a thrust shaft that extends through the gearbox to connect the fan to an axial location bearing mounted on the core shaft, thereby relieving the output shaft of responsibility for axially locating the fan relative to the core shaft; and, a monitoring system as claimed in claim 8 for monitoring the axial position of the thrust shaft, the first phonic wheel being mounted coaxially to the thrust shaft for rotation therewith.

* * * * *